(12) United States Patent
Ohba et al.

(10) Patent No.: US 9,699,432 B2
(45) Date of Patent: *Jul. 4, 2017

(54) INFORMATION PROCESSING APPARATUS, INFORMATION PROCESSING METHOD, AND DATA STRUCTURE OF POSITION INFORMATION

(75) Inventors: Akio Ohba, Kanagawa (JP); Hiroyuki Segawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 567 days.

This patent is subject to a terminal disclaimer.

(21) Appl. No.: 14/005,039

(22) PCT Filed: Jan. 16, 2012

(86) PCT No.: PCT/JP2012/000211
§ 371 (c)(1),
(2), (4) Date: Sep. 13, 2013

(87) PCT Pub. No.: WO2012/132168
PCT Pub. Date: Oct. 4, 2012

(65) Prior Publication Data
US 2014/0002604 A1    Jan. 2, 2014

(30) Foreign Application Priority Data

Mar. 31, 2011    (JP) .................................. 2011-079991

(51) Int. Cl.
*H04N 13/00* (2006.01)
*G06K 9/46* (2006.01)
(Continued)

(52) U.S. Cl.
CPC ......... *H04N 13/0018* (2013.01); *G06T 7/593* (2017.01); *H04N 13/0007* (2013.01);
(Continued)

(58) Field of Classification Search
CPC ..... G06T 7/2086; G06T 7/004; G06T 7/0075; G06T 7/2006; G06T 2207/10021; G06T 2207/20016; G06T 2207/20144
(Continued)

(56) References Cited

U.S. PATENT DOCUMENTS

2010/0002764 A1    1/2010    Lie
2010/0220921 A1    9/2010    Blake
(Continued)

FOREIGN PATENT DOCUMENTS

CN    101277454 A    10/2008
CN    101720047 A    6/2010
(Continued)

OTHER PUBLICATIONS

Kazunori ("Subtraction Stereo: A Stereo Camera System That Focuses on Moving Regions," Proceedings of SPIE, vol. 7239, pp. 1-11, Jan. 18, 2009).*
(Continued)

*Primary Examiner* — Jeremaiah C Hallenbeck-Huber
*Assistant Examiner* — Susan E Hodges
(74) *Attorney, Agent, or Firm* — Matthew B. Dernier, Esq.

(57) ABSTRACT

An image pickup apparatus 12 includes a first camera 22 and a second camera 24. The cameras pick up an image of a target at the same timing and at the same frame rate from left and right positions spaced by a known distance from each other. Picked up frame images are converted into image data of a predetermined plurality of resolutions. An input information acquisition section 26 of an information processing apparatus 14 acquires an instruction input from a user. A position information production section 28 approximately estimates a region of the target or a region which involves some movement on an image of a low resolution and a wide
(Continued)

range from within stereo image data as a target region and carries out stereo matching only in regard to the region on an image of a high resolution to specify a three-dimensional position of the target. An output information production section 32 carries out a necessary process based on the position of the target to produce output information. A communication section 30 carries out request for and acquisition of image data to and from the image pickup apparatus 12.

10 Claims, 10 Drawing Sheets

(51) Int. Cl.
*G06T 7/20* (2017.01)
*G06T 5/00* (2006.01)
*G06T 7/593* (2017.01)
*H04N 13/02* (2006.01)

(52) U.S. Cl.
CPC .................. *H04N 13/0271* (2013.01); *G06T 2207/10021* (2013.01); *G06T 2207/20016* (2013.01); *H04N 13/0239* (2013.01); *H04N 2013/0074* (2013.01); *H04N 2013/0081* (2013.01)

(58) Field of Classification Search
USPC ...................................... 348/47, 43; 382/107
See application file for complete search history.

(56) References Cited

U.S. PATENT DOCUMENTS

| 2010/0245544 | A1 | 9/2010 | Nakajima |
| 2010/0315490 | A1 | 12/2010 | Kim |
| 2011/0141238 | A1 | 6/2011 | Tsukagoshi |

FOREIGN PATENT DOCUMENTS

| JP | 11223516 A | 8/1999 |
| JP | 2000020698 A | 1/2000 |
| JP | 2001126065 A | 5/2001 |
| JP | 2001266128 A | 9/2001 |
| JP | 2004260251 A | 9/2004 |
| JP | 2008298533 A | 12/2008 |
| JP | 2009068935 A | 4/2009 |
| JP | 2009070344 A | 4/2009 |
| JP | 2009294733 A | * 12/2009 |
| JP | 2010079651 A | 4/2010 |
| JP | 2010145186 A | 7/2010 |
| TW | 201004361 A | 1/2010 |
| TW | M373507 U | 2/2010 |
| TW | 201108714 A | 3/2011 |
| WO | 2007050885 A2 | 5/2007 |

OTHER PUBLICATIONS

International Search Report for corresponding PCT/2012/000211, dated Apr. 17, 2012.
Office Action for corresponding TW patent Application No. 101107926, dated May 12, 2014.
European Search Report for corresponding EP application 12764539.8, dated Sep. 15, 2014.
Takashi Kudo et al: "Hierarchical Stereo Matching Via Color Segmentation" Digital Signal Processing Workshop, 12th—Signal Processing Education Workshop, 4th, pp. 522-525, Sep. 1, 2006.
Minglun Gong, et al., "Multi-resolution stereo matching using genetic algorithm" Stereo and Multi-Baseline Vision, Proceedings. IEEE Workshop on Kauai, Computer Society, 9 pages, pp. 21-29, Dec. 9, 2001.
Office Action for corresponding JP Application No. 2011-079991, dated Oct. 21, 2014.
Office Action for corresponding EP Application No. 12764539.8-1903, dated May 19, 2015.
Strong J P: "Computations on the Massively Parallel Processor at the Goddard Space Flight Center", Proceedings of the IEEE, IEEE. New York, US, vol. 79, No. 4, pp. 548-557, (Apr. 1, 1991).
Sagawa R et al: "Incremental mesh modeling and hierarchical object recognition using multiple range images", Proceedings of the 2000 IEEE/RSJ International Conference on Intelligent Robots and Systems. (IROS 2000). Takamatsu, Japan, Oct. 31-Nov. 5, 2000; [IEEE/RSJ International Conference on Intelligent Robots and Systems], New York, NY: IEEE, US, vol. 1, pp. 88-95, (Oct. 31, 2000).
International Preliminary Report on Patentability and Written Opinion for corresponding application No. PCT/2012/000211, dated Oct. 1, 2013.
Office Action for corresponding CN Application No. 201280014669.5, 9 pages, dated Nov. 2, 2015.
Yong Zhao, "Real-Time Stereo on GPGPU using progressive multi-resolution adaptive windows," Image and Vision Computing, vol. 29, Issue 6, pp. 420-432 May 2011.
Zhao J ie, "Pyramid two-level dynamic programming stereo matching algorithm" Robot Research Institute, Harbin Institute of Technology, Period 1, vol. 2, pp. 69-77, Jan. 2007.

* cited by examiner

INFORMATION PROCESSING APPARATUS, INFORMATION PROCESSING METHOD, AND DATA STRUCTURE OF POSITION INFORMATION

CROSS REFERENCE TO RELATED APPLICATIONS

This application claims priority to International Application No. PCT/JP2012/000211, filed Jan. 16, 2012, which claims priority to Japanese Application No. JP2011-079991, filed Mar. 31, 2011, the entire disclosures of which are hereby incorporated by reference.

TECHNICAL FIELD

The present invention relates to an information processing apparatus and an information processing method for carrying out a process coordinated with a movement of a target whose moving image is being picked up, and a data structure of position information produced by the process.

BACKGROUND ART

In recent years, it has become popularized to incorporate a camera into a personal computer or a game machine to pick up an image of the figure of a user and utilize the image in various forms. For example, apparatus which transmit an image of a user as it is to another party via a network such as video phones or video chats or apparatus which recognize a movement of a user by image analysis to obtain input information for a game or an information processing have been put into practical use (refer to, for example, Patent Literature 1).

CITATION LIST

Patent Literature

[PTL 1] WO 2007/050885 A2

SUMMARY

Technical Problem

In order to implement various processes in good response and in high accuracy using picked up images, picture quality suitable for the contents of the processes is required. However, in the present situation, from such points of view as the fabrication cost, the transmission band of the image, the response from image pickup to outputting and so forth, it is difficult to enrich functions of an information processing apparatus only by enhancing a performance or picture quality of a camera. For example, as the performance of an image pickup element of a camera is enhanced, the bandwidth of the band for image data transmission between the camera and a host apparatus is compressed as much and besides the time required for the image analysis increases as much.

The present invention has been made in view of such a problem as just described, and it is an object of the present invention to provide a technology which can implement information processing using a picked up image in good response.

Solution to Problem

A mode of the present invention relates to an information processing apparatus. This information processing apparatus is an information processing apparatus which carries out stereo matching using stereo moving images obtained by picking up video images of a target simultaneously from different points of view to output position information of the target at a predetermined rate. The information processing apparatus is characterized by including: a position information acquisition section which carries out stereo matching using images of a resolution selected based on information relating to the magnitude of an image of the target from among a plurality of picked up images in which an image frame pair included in the stereo moving images is represented by a plurality of predetermined resolutions to acquire position information of the target; and a depth image data production section which updates, based on the acquired position information, a depth image having the resolution of the image used for the stereo matching by the position information acquisition section from among a plurality of depth images stored in a memory and representing, by the plurality of resolutions, a depth image representing the position of the target in a depthwise direction as a pixel value on an image plane to output the position information of the target.

Another mode of the present invention relates to an information processing method. This information processing method is an information processing method of carrying out stereo matching using stereo moving images obtained by picking up video images of a target simultaneously from different points of view to output position information of the target at a predetermined rate. The information processing method is characterized by including: a step of carrying out stereo matching using images of a resolution selected based on information relating to the magnitude of an image of the target from among a plurality of picked up images in which an image frame pair included in the stereo moving images is represented by a plurality of predetermined resolutions to acquire position information of the target; and a step of updating, based on the acquired position information, a depth image having the resolution of the image used for the stereo matching from among a plurality of depth images stored in a memory and representing, by the plurality of resolutions, a depth image representing the position of the target in a depthwise direction as a pixel value on an image plane to output the position information of the target.

A further mode of the present invention relates to a data structure. This data structure is a data structure of position information which represents position information of a target whose moving images are being picked up and is updated every time position information is acquired. The data structure is characterized in that a plurality of depth images having resolutions corresponding to a plurality of resolutions of a frame produced for acquisition of position information are associated so as to allow changeover of a resolution of a depth image in which the position of the target in a depthwise direction is represented as a pixel value on an image plane corresponding to a frame of a moving image and in which, by a resolution of a frame used for acquisition of position information, the position information of a result of the acquisition is reflected.

It is to be noted that also an arbitrary combination of the components described above and results of conversion of the representation of the present invention between a method, an apparatus, a system, a computer program, a recording medium in which the computer program is recorded and so forth are effective as modes of the present invention.

Advantageous Effect of Invention

According to the present invention, an information processing which utilizes a picked up image as input information can be implemented with a high response.

DESCRIPTION OF EMBODIMENT

Figure 1:
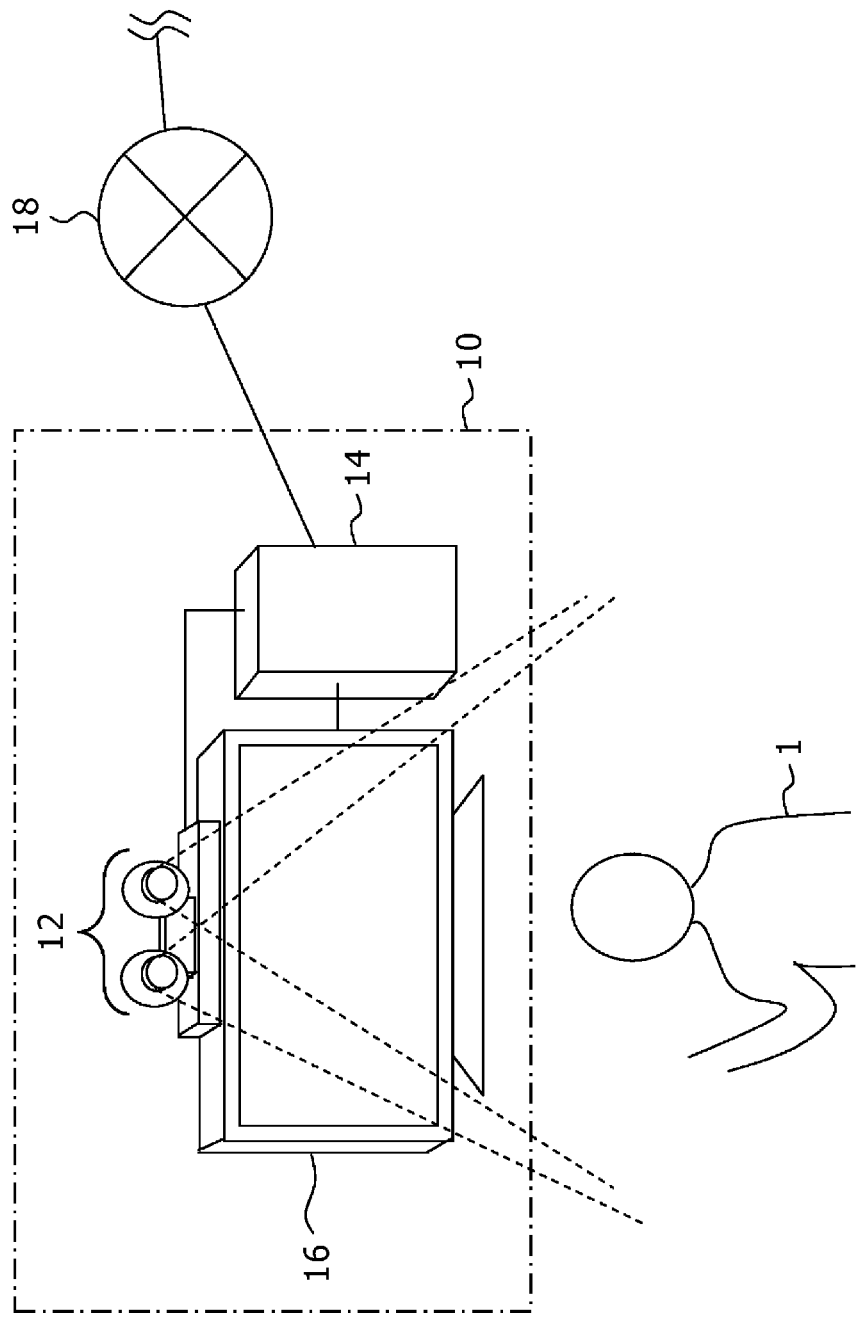
FIG. 1 is a view showing an example of a configuration of an information processing system to which an embodiment can be applied.

FIG. 1 shows an example of a configuration of an information processing system to which an embodiment can be applied. The information processing system 10 includes an image pickup apparatus 12 in which two cameras for picking up an image of a target such as a user 1 are mounted, an information processing apparatus 14 for carrying out information processing in accordance with a request of the user based on picked up images, and a display apparatus 16 for outputting image data obtained as a result of the processing by the information processing apparatus 14. The information processing apparatus 14 can be connected to a network 18 such as the Internet.

The information processing apparatus 14, image pickup apparatus 12, display apparatus 16 and network 18 may be connected to each other by a wire cable or may be wirelessly connected by a wireless LAN (Local Area Network) or the like. Two or all of the image pickup apparatus 12, information processing apparatus 14 and display apparatus 16 may be combined and provided integrally. The image pickup apparatus 12 may not necessarily be installed on the display apparatus 16. Further, the user 1 may not be a person, and the number of such users is not limited specifically.

The image pickup apparatus 12 is configured such that two digital video cameras each including an image pickup element of a CCD (Charge Coupled Device), a CMOS (Complementary Metal Oxide Semiconductor) or the like are disposed on the left and right in a spaced relationship by a known distance from each other. The two digital video cameras individually pick up an image of a target existing in the same space at a predetermined frame rate from the left and right positions. A pair of frames picked up in this manner are hereafter referred to also as "stereo images." The image pickup apparatus 12 further produces a plurality of pieces of image data having different resolutions from a pair of RAW images obtained as a result of the image pickup.

The information processing apparatus 14 specifies, at a predetermined rate, position coordinates of the target in the three-dimensional space having the vertical, horizontal and depthwise directions with respect to the field of view of the cameras. At this time, the information processing apparatus 14 carries out stereo matching based on the data of stereo images acquired from the image pickup apparatus 12. A variation of the position coordinates obtained in this manner with respect to time is utilized for processing at a later stage at which a movement of the target is used as input information. While the variation of the position coordinates can be used, for example, in a game in which a character on which a movement of the user 1 as the target is reflected appears, an information process in which a movement of the user 1 is converted into a command input and so forth, contents of such use are not restricted.

The display apparatus 16 displays a result of a process carried out by the information processing apparatus 14 as an image as occasion demands. The display apparatus 16 may be a television set having a display unit for outputting an image and a speaker for outputting sound and is, for example, a liquid crystal television set, a plasma television set or a PC display unit. Since contents of a process executed finally by the information processing apparatus 14 and an image to be displayed are not specifically restricted by an object of use thereof as described above, principally a specification process of the position of the target carried out by the information processing apparatus 14 is described below.

Figure 2:
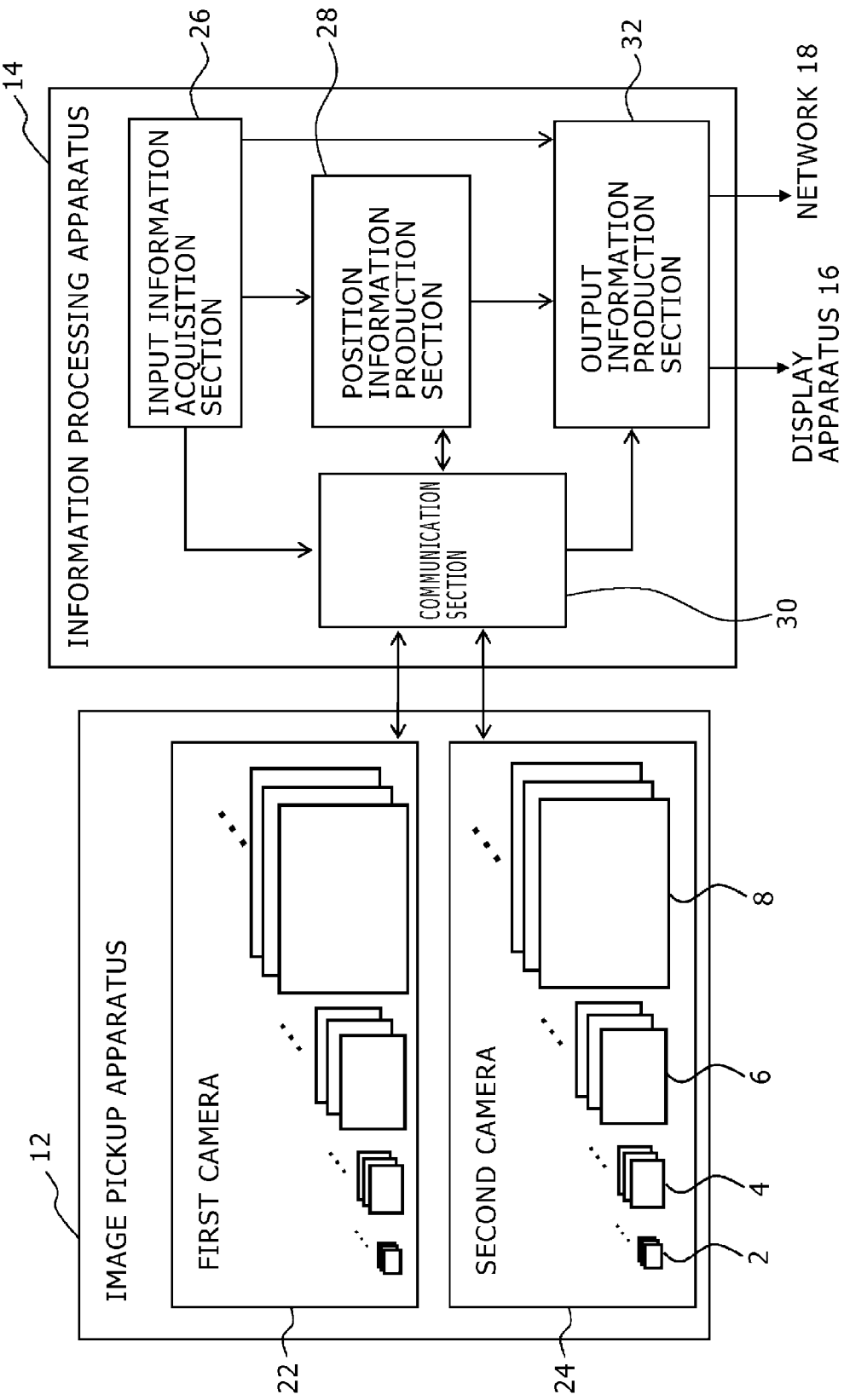
FIG. 2 is a view showing a configuration of an image pickup apparatus and an information processing apparatus in the present embodiment.

FIG. 2 shows a configuration of the image pickup apparatus 12 and the information processing apparatus 14. Functional blocks shown in FIGS. 2 to 5 can be implemented, where they are configured from hardware, using such components as a CPU (Central Processing Unit), a RAM (Random Access Memory), a ROM (Read Only Memory) and a drawing circuit, and can be implemented, where they are configured from software, using a program which exerts such various functions as a data inputting function, a data retaining function, an image analysis function and a drawing function. Accordingly, it can be recognized by those skilled in the art that the functional blocks can be implemented in various forms only by hardware, only by software or by a combination of hardware and software and are not restricted to any of them.

The image pickup apparatus 12 includes a first camera 22 and a second camera 24. The cameras pick up images of a target at the same timing and at the same frame rate from the left and right positions spaced away from each other by a known distance. Then, the cameras convert the picked up frame images into image data of a plurality of predetermined resolutions. FIG. 2 schematically illustrates images produced in this manner, and the resolution of the second camera increases stepwise in the order of images 2, images 4, images 6 and images 8. While FIG. 2 illustrates four different resolutions, the number of such resolutions is not restricted. Also the first camera 22 generates similar images.

Since such images are produced at every image pickup timing, an image sequence with respect to the time axis is, as a result, produced at the different resolutions. In FIG. 2, the time axis is schematically indicated in the depthwise direction. It can be grasped that images produced at the same timing configure a hierarchical structure having hierarchies corresponding to the resolutions. In the following description, the images are referred to as an image of the 0th hierarchy, an image of the first hierarchy, an image of the second hierarchy, . . . in the order of the resolution from an image of the lowest resolution. In the example of FIG. 2, the images 2 are images of the 0th hierarchy, the images 4 are images of the first hierarchy, the images 6 are images of the second hierarchy, and the images 8 are images of the third hierarchy.

The information processing apparatus 14 includes an input information acquisition section 26 for acquiring an instruction input from the user, and a position information production section 28 for producing position information of a target such as the user 1 based on picked up images. The information processing apparatus 14 further includes an output information production section 32 for carrying out a necessary process based on the position of the target to produce output information, and a communication section 30 serving as an interface for carrying out requesting for and acquisition of image data to and from the image pickup apparatus 12.

The input information acquisition section 26 accepts an instruction input from the user and transmits a process request signal corresponding to the instruction input to the other functional blocks. The input information acquisition section 26 is implemented by cooperation of a general inputting apparatus such as buttons, a keyboard, a mouse, a trackball, or a touch panel, a CPU for interpreting contents of an operation carried out on the inputting apparatus to generate a process request signal, and so forth.

The position information production section 28 carries out stereo matching using data of stereo images produced by the first camera 22 and the second camera 24 to specify the three-dimensional position of the target. At this time, the position information production section 28 selectively uses minimum required image data temporally and spatially as a processing target to reduce the influence on the accuracy and reduce the load of processing.

In particular, the position information production section 28 roughly estimates a region of a target or a region including a movement in a low-resolution and wide-range image as a target region and carries out stereo matching of an image of a high resolution only in regard to the region. In stereo matching, generally, a search for extracting corresponding points of two images is carried out. By narrowing the search range, the efficiency of the stereo matching is enhanced. It is to be noted that, since, in the present embodiment, information processing using moving images as input information is implemented, a method of acquiring position information principally of a region in which a "movement" of a target is involved is described.

At this time, a process of estimating a region is carried out at a timing separate from that at which the stereo matching is carried out by predicting a region which involves a movement of the target up to a timing later by a predetermined interval of time. For example, where the information processing apparatus 14 is implemented by a computer ready for multiple threads, the two processes are executed independently of each other as separate threads. This makes it possible to use a comparatively long period of time for the stereo matching process which requires higher accuracy. For example, while the stereo matching process uses all frames of picked up images as a processing target, the process for estimating a region is carried out for every predetermined number of frames, and prediction is carried out for frames before the process for estimating a region is carried out subsequently.

The process of estimating a region includes also selection of an appropriate hierarchy for carrying out stereo matching. As the target comes nearer, the parallax increases.

Therefore, even an image of a comparatively low resolution exhibits a great amount of displacement between the left and right images and the accuracy in stereo matching can be maintained readily. On the contrary, as the target goes farther, the parallax decreases. Therefore, an image of a low resolution exhibits an amount of displacement between the left and right images which remains within a range of an error, and the accuracy in stereo matching cannot be maintained readily.

Therefore, in the present embodiment, a hierarchy of an image to be used for stereo matching is selected depending upon the size of a region which involves a movement. Even if an image of a high resolution is used, since the region to be searched in order to obtain corresponding points is a local region as described above, the image size of a processing target is equal irrespective of the position of the target in the depthwise direction and the calculation amount does not vary very much. Therefore, also estimation of the calculation time can be carried out readily.

The position information production section 28 further produces a depth image wherein position coordinates of the target in the depthwise direction obtained by stereo matching are represented as pixel values on an image plane which has a vertical direction and a horizontal direction. Such depth images have a hierarchical structure represented by a plurality of resolutions same as those of a hierarchical structure of picked up images produced by the cameras. As described hereinabove, a movement of the target involves a spatial resolution necessary to recognize the movement as a movement depending upon the position in the depthwise direction. In other words, depending upon a spatial resolution necessary for a process carried out by the output information production section 32 at a succeeding stage, the accuracy sometimes enhances rather where such a movement is ignored. Therefore, depth images are formed in a hierarchical structure such that a hierarchy to be referred to is changed over depending upon a resolution required by a process at a succeeding stage to improve the efficiency and the accuracy of the process.

The output information production section 32 acquires position information produced by the position information production section 28 and suitably carries out a process conforming to an object of use of the position information. The process carried out here is not restricted specifically as described above and may be suitably changed over in accordance with an instruction from the user accepted by the input information acquisition section 26. At this time, the output information production section 32 refers to a depth image of a hierarchy corresponding to a resolution determined in advance and acquires only a movement significant to the process to be carried out as described above. The data obtained as a result of the process is displayed on the display apparatus 16 or transmitted to a different apparatus through the network 18.

Depending upon the object of use, the output information production section 32 may carry out processing based on position information produced by the position information production section 28 for an image picked up by one of the cameras of the image pickup apparatus 12 so that the processed image may be displayed on the display apparatus 16. For example, the output information production section 32 can represent a manner in which the user holds and swings a sword by acquiring a movement of a hand of the user 1 or a controller gripped by the hand of the user 1 in a picked up image from the position information production section 28 and carrying out a process of superposing the image of the sword on the pertaining position of the picked up image for all frames.

In this instance, frames of one of the stereo images to be used by the position information production section 28 for stereo matching may be acquired at the same time, each processed, and then outputted to the display apparatus 16. Alternatively, image data of a frame picked up by one of the cameras may be acquired and processed independently of stereo matching. The rate at which stereo matching is carried out, the rate at which estimation of a target region is carried out and the frame rate used for production of an output image may be determined independently of one another.

As the rates of the processes increase, a more detailed process from the point of view of the temporal resolution can be carried out. However, a load upon a communication band or the processing increases. Therefore, the rates of the processes may be selected in response to an original performance of the information processing system 10, whether or not a process being carried out in parallel exists or a like condition. A table in which usable communication bands or processing resources and their rates are associated with each other may be prepared such that it may be referred to in response to an actual processing environment to determine the rates.

The communication section 30 acquires information of a hierarchy and a region necessary for a process by the information processing apparatus 14 from within images of a hierarchical structure produced by the first camera 22 and the second camera 24 from the input information acquisition section 26 and the position information production section 28 and issues a request to the image pickup apparatus 12. Then, image data transmitted from the image pickup apparatus 12 in response to the request is suitably supplied to the position information production section 28 and the output information production section 32.

Figure 3:
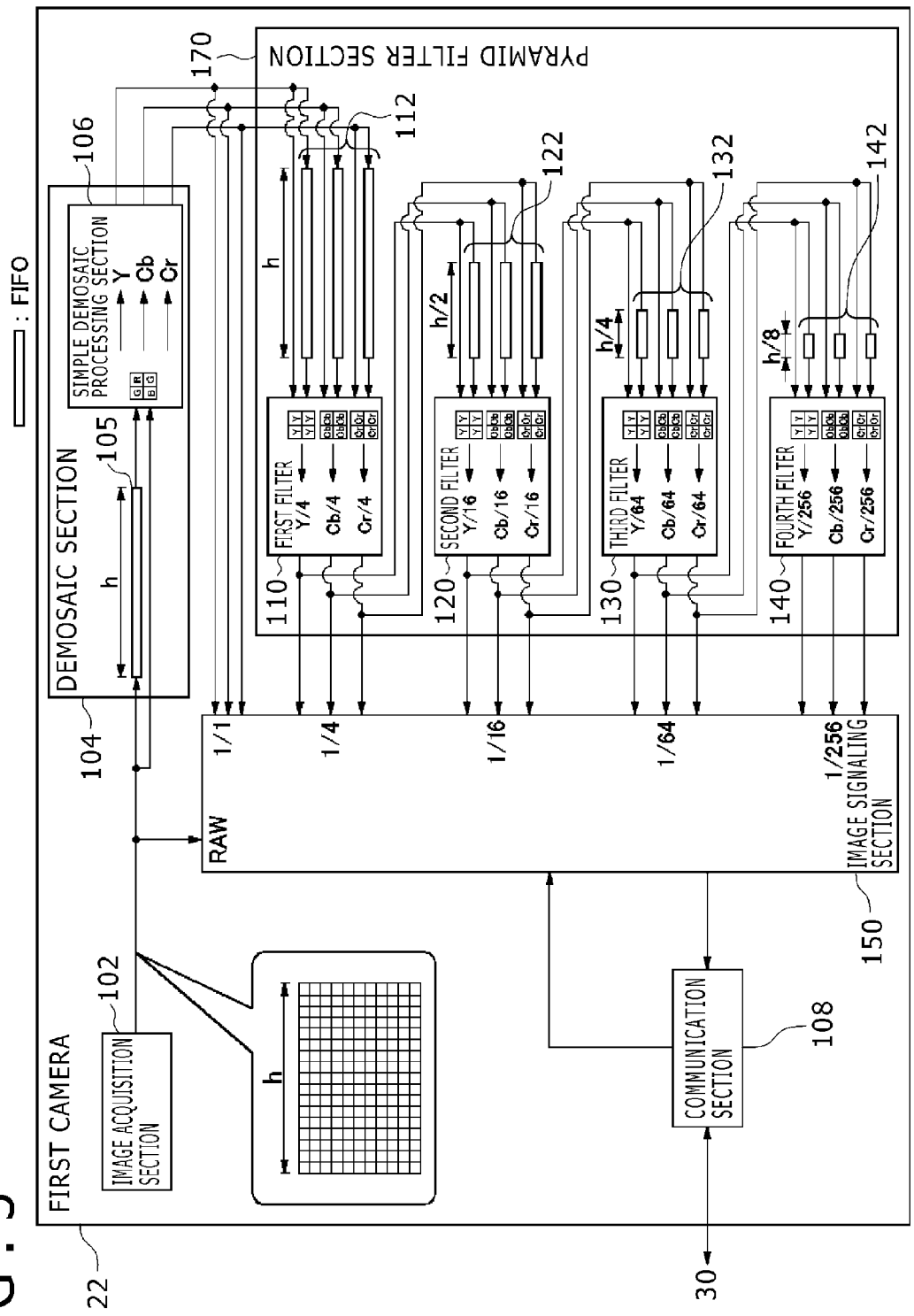
FIG. 3 is a view particularly showing a configuration of a first camera in the present embodiment.

FIG. 3 particularly shows a configuration of the first camera 22. It is to be noted that the second camera 24 has the same configuration. The first camera 22 includes an image acquisition section 102, a demosaic section 104, an image signaling section 150, a pyramid filter section 170 and a communication section 108. The image acquisition section 102 reads out an image exposed by an image pickup element such as a CCD image pickup element or a CMOS image pickup element at a predetermined timing (for example, 60 times per second). In the following description, it is assumed that this image has a width corresponding to h pixels in the horizontal direction. This image is a so-called RAW image. Every time exposure for RAW images for one horizontal row is completed, the image acquisition section 102 sends the images to the demosaic section 104 and the image signaling section 150.

The demosaic section 104 includes a FIFO (First In First Out) buffer 105 having a capacity for h pixels and a simple demosaic processing section 106. To the FIFO buffer 105, pixel information of RAW images for one horizontal row is inputted and is retained until pixels of a next horizontal row are inputted to the demosaic section 104. When pixels of two horizontal rows are received, the simple demosaic processing section 106 executes a demosaic (de-mosaic) process of using the pixels of the two horizontal rows to complete color information for the pixels based on peripheral pixels to create a full color image.

Although a large number of techniques are available for this demosaic process as well known by those skilled in the art, here it is sufficient to use the simple demosaic process which uses only pixels for two horizontal rows. As an example, where a pixel with regard to which corresponding YCbCr values are to be calculated only has a G value, RGB values are obtained in the following manner: an R value is obtained by averaging R values adjacent on the left and right; the G value is used as it is; and a B value positioned upwardly or downwardly is used as a B value. The RGB values are then substituted into a predetermined transform expression to calculate YCbCr values. Since such a demosaic process is well known, more detailed description is omitted.

As a modification to the simple demosaic process, a technique of configuring YCbCr values of one pixel from four pixels of R, G and B may be used. Since, in this instance, a demosaic image of a size equal to a quarter of that of the RAW image is obtained, a first filter 110 hereinafter described is not required. The simple demosaic processing section 106 converts, for example, four pixels of R, G and B in two rows×two columns into YCbCr color signals as illustrated in the drawing. Then, the block configured from the four pixels is transferred as a 1/1 demosaic image to the image signaling section 150 and is also sent to the pyramid filter section 170.

The pyramid filter section 170 has a function of hierarchically converting a certain image into a plurality of resolutions and outputting. A pyramid filter generally includes ¼ reduction filters the number of which corresponds to levels for required resolutions. In the present embodiment, the pyramid filter section 170 includes filters of four hierarchies of the first filter 110 to a fourth filter 140. Each filter executes a process of bilinearly interpolating four pixels adjacent each other to arithmetically operate an average pixel value of the four pixels. Accordingly, the image size after the process is a quarter of that of the image before the process.

At the preceding stage to the first filter 110, one FIFO buffer 112 for h pixels is disposed corresponding to each of the signals of Y, Cb and Cr. The FIFO buffers 112 have a role of retaining YCbCr pixels for one horizontal row until pixels for a next one horizontal row are outputted from the simple demosaic processing section 106. The retention time of the pixels depends upon the speed of line scanning of the image pickup elements.

After pixels for two horizontal rows are inputted, the first filter 110 averages pixel values of Y, Cb and Cr for four pixels in two rows×two columns. By repeating this process, the lengths of the 1/1 demosaic image in both of the vertical and horizontal directions are reduced by half. Consequently, the original image is converted into an image of a quarter size as a whole. The ¼ demosaic image obtained by the conversion is sent to the image signaling section 150 and transferred to the second filter 120 at the succeeding stage.

At the preceding stage to the second filter 120, one FIFO buffer 122 for 2/h pixels is disposed corresponding to each of the signals of Y, Cb and Cr. Also the FIFO buffers 114 have a role of retaining YCbCr pixels for one horizontal row until pixels for a next horizontal row are outputted from the first filter 110.

After pixels for two horizontal rows are inputted, the second filter 120 averages pixel values of Y, Cb and Cr for four pixels in two rows×two columns. By repeating this process, the lengths of the ¼ demosaic image in both of the vertical and horizontal directions are reduced by half, and the original image is converted into an image of a size of ¹⁄₁₆ as a whole. The ¹⁄₁₆ demosaic image obtained by the conversion is sent to the image signaling section 150 and transferred to the third filter 130 at the succeeding stage.

Also the third filter 130 and the fourth filter 140 repeat a process similar to that described above except that FIFO buffers 132 each for h/4 or FIFO buffers 142 each for h/8 are disposed at the preceding stage. Then, the third filter 130 and the fourth filter 140 output demosaic images of a ¹⁄₆₄ size and a ¹⁄₂₅₆ size, respectively, to the image signaling section 150. It is to be noted that, since such pyramid filters as described above are well known as disclosed in the specification of European Patent Application Publication No. 0999518 or the like, more detailed description is omitted herein.

In this manner, from the filters of the pyramid filter section 170, image outputs successively reduced to ¼ are inputted to the image signaling section 150. As can be recognized from this, as the number of filters in the pyramid filter section 170 through which an image passes increases, the magnitude of a FIFO buffer required for the preceding stage to each filter may be reduced.

The image signaling section 150 selects, from within hierarchical images including a RAW image received from the image acquisition section 102, a 1/1 demosaic image received from the demosaic section 104 and ¼ to ¹⁄₂₅₆ demosaic images received from the pyramid filter section 170, a necessary hierarchy and region in accordance with an instruction received from the communication section 30 of the information processing apparatus 14 through the communication section 108. Then, the image signaling section 150 configures a packet from the images and sends the packet to the communication section 108.

The communication section 108 signals the packet to the information processing apparatus 14 in accordance with a predetermined protocol such as, for example, USB 1.0/2.0. The communication with the information processing apparatus 14 is not limited to wire communication but may be, for example, wireless LAN communication such as IEEE 802.11a/b/g or infrared communication such as IrDA.

Figure 4:
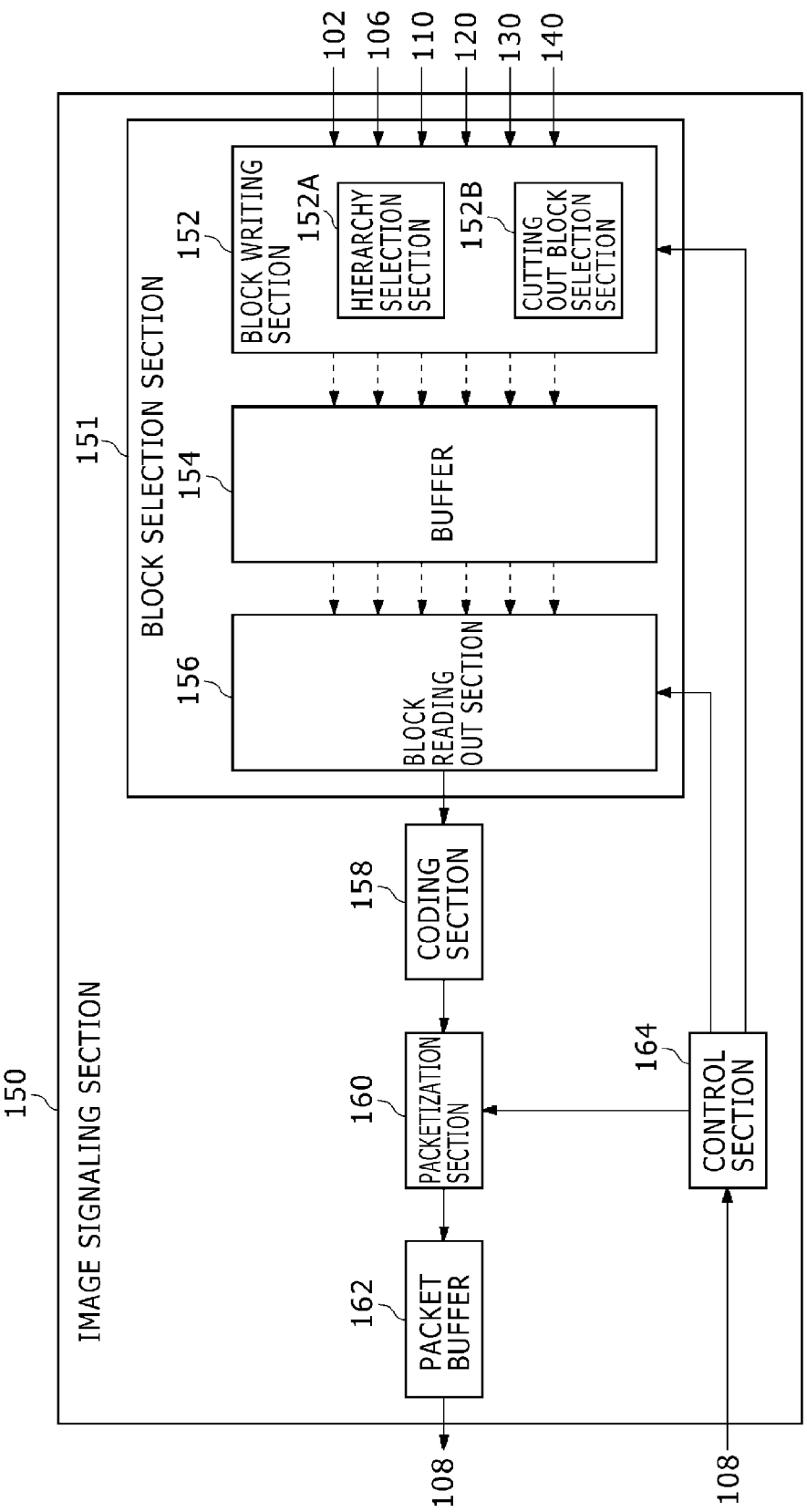
FIG. 4 is a view showing a configuration of an image signaling section in the present embodiment.

FIG. 4 shows a configuration of the image signaling section 150. The image signaling section 150 includes a block writing section 152, a buffer 154, a block reading out section 156, a coding section 158, a packetization section 160, a packet buffer 162 and a control section 164. The control section 164 sends an instruction to the block writing section 152 and the block reading out section 156 as to which one of various pieces of image data is to be signaled as a packet based on an instruction from the information processing apparatus 14.

To the block writing section 152, demosaic images of 1/1 to ¹⁄₂₅₆ sizes are inputted through the demosaic section 104 and the pyramid filter section 170. Further, depending upon the processing contents to be executed by the output information production section 32 of the information processing apparatus 14, a RAW image is inputted from the image acquisition section 102. A hierarchy selection section 152A of the block writing section 152 selects one of the hierarchies for the demosaic images based on an instruction from the control section 164.

A cutting out block selection section 152B receives position information of a region necessary for a process sent thereto from the information processing apparatus 14 and selects a block which includes a region greater by a predetermined number of pixels than the region as a specific block. It is to be noted that one block preferably has a size of 8×8 pixels in accordance with JPEG coding at a succeeding stage. The block selection section 152B cuts out only part of blocks of a selected demosaic image and writes into the buffer 154.

At this time, the image is received for each 2×2 pixels and sequentially written into the buffer 154. The block reading out section 156 reads out the image blocks in the order in which pixels for one block are prepared on the buffer 154, and sends the image blocks to the coding section 158. The block writing section 152 and the block reading out section 156 are adjusted so as to operate in synchronism with each other by the control section 164. In other words, while reading and writing by the block writing section 152 are carried out every time pixels are outputted from the image acquisition section 102, demosaic section 104 and pyramid filter section 170, reading out by the block reading out section 156 is carried out every time pixels for one block are stored into the buffer 154. The synchronous timing depends upon the exposure speed of the cameras.

In the present embodiment, a RAW image or a reduced image is send to the information processing apparatus 14 in a unit of a block, but not after pixels of the entire RAW image or the entire reduced image are prepared. Therefore, it is sufficient if the buffer 154 has a capacity for, at most, storing all image blocks of a RAW image or a reduced image. Depending upon the object of use of an image, the buffer 154 may have a capacity for storing two or three image blocks. Since data to be buffered are reduced and are sequentially packetized and transferred every time a block is produced, the latency involved in processing in the image pickup apparatus 12 is reduced.

Further, since pixels are outputted from the image acquisition section 102 and, from the pyramid filter section 170, pixels are sequentially outputted to the block writing section 152 every time exposure of the image pickup elements comes to an end, such a situation that blocks of different frames are written into the buffer 154 or that blocks are packetized and sent in a wrong order cannot occur from the structure.

The coding section 158 executes known compression coding such as JPEG coding for image blocks of an image other than a RAW image and sends the coded image blocks to the packetization section 160. The packetization section 160 packetizes the image blocks of the image after the coding in the order in which the image blocks arrive and writes the packetized image blocks into the packet buffer 162. The communication section 108 transfers the packets in the packet buffer 162 to the information processing apparatus 14 in accordance with a predetermined communication protocol. It is to be noted that also an image other than a RAW image may not be subjected to compression coding by the coding section 158, and the packetization section 160 may directly packetize blocks acquired from the block reading out section 156.

It is to be noted that, although other known coding methods such as LLVC or AVC can also be used, preferably a coding method which can carry out coding in a unit of a block is used. In addition, the size of a block to be read out from the block reading out section 156 can be changed in accordance with coding. For example, reading out and coding in a block of a unit of 256×256 pixels may be carried out.

Figure 5:
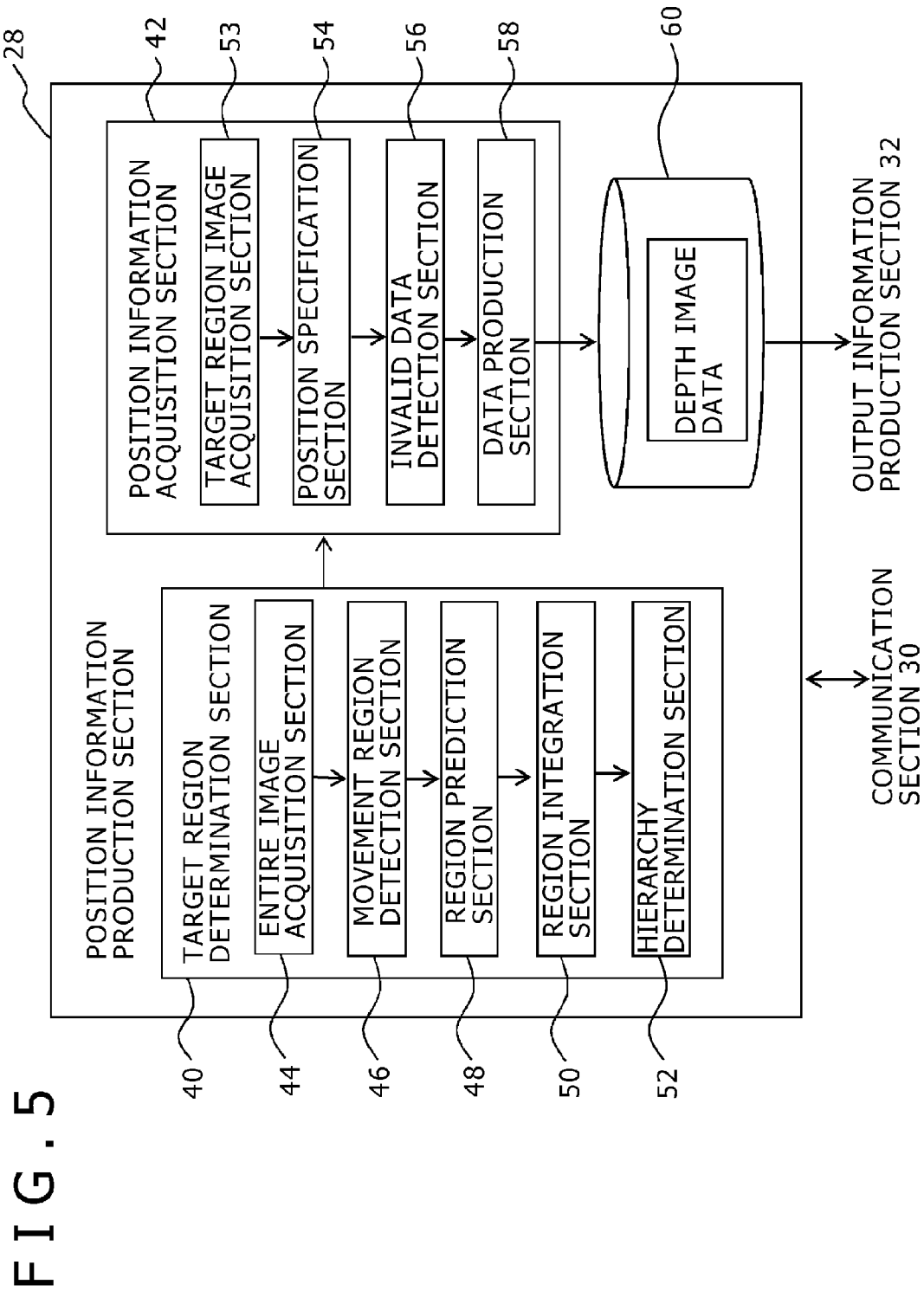
FIG. 5 is a view particularly showing a configuration of a position information production section of the information processing apparatus in the present embodiment.

FIG. 5 particularly shows a configuration of the position information production section 28 of the information processing apparatus 14. The position information production section 28 includes a target region determination section 40 for determining a target region and a target hierarchy to be used for stereo matching, and a position information acquisition section 42 for carrying out stereo matching to acquire position information of a target. The target region determination section includes an entire image acquisition section 44, a movement region detection section 46, a region prediction section 48, a region integration section 50 and a hierarchy determination section 52.

The entire image acquisition section 44 acquires, from among hierarchical data of stereo images produced by the first camera 22 and the second camera 24 of the image pickup apparatus 12, images of an overall region of the 0th hierarchy of the lowest resolution at a predetermined rate. The images to be acquired here may be only Y images. However, the hierarchy and the type of an image to be used may be selected suitably in response to the processing capacity, communication speed and so forth.

The movement region detection section 46 detects a movement region from each of the stereo images acquired by the entire image acquisition section 44. For example, if the target is a person, then the movement region detection section 46 first carries out detection of the face and estimates a region in which it is expected to include an image of the person. A difference image is then obtained by comparing with an image used at the immediately preceding time step with regard to the estimated region, and the movement region detection section 46 detects a region which has a difference equal to or greater than a predetermined threshold value, a region circumscribing the region or a like region as a movement region.

The region prediction section 48 predicts, with regard to each of the stereo images, a target region to be searched by a future stereo matching process based on the movement region detected by the movement region detection section 46. The region integration section 50 integrates the target regions of the stereo images predicted by the region prediction section 48 on a unified coordinate system to determine one target region at each point of time. The hierarchy determination section 52 selects, based on the magnitude of the target region, a hierarchy with which stereo matching can be carried out with a high degree of accuracy while the resolution is not unnecessarily high.

The position information acquisition section 42 includes a target region image acquisition section 53, a position specification section 54, an invalid data detection section 56, and a data production section 58. The target region image acquisition section 53 designates the target region and the hierarchy determined by the target region determination section 40 to acquire stereo image data from the image pickup apparatus 12. The position specification section 54 carries out stereo matching for the stereo image acquired by the target region image acquisition section 53 to specify three-dimensional position information including a position in the depthwise direction.

As the stereo matching process carried out here, any one of various techniques proposed so far may be used. For example, an area correlation method or a like technique can be used. In the area correlation method, a correlation window is set to one of left and right images. While a search window of the other image is being moved, a cross-correlation coefficient between the search window and the image in the correlation window is calculated to acquire corresponding points. Three-dimensional position information is then determined based on the parallax between the corresponding points using the principle of the triangulation.

The invalid data detection section 56 specifies data to be invalidated from within the position information specified by the position specification section 54. Since the parallax decreases as the target goes farther as described above, where the images have a low resolution, even if the position in the depthwise direction is calculated, it has a great error. In other words, the range in the depthwise direction in which appropriate calculation can be carried out differs depending upon the resolution of an image to be used for stereo matching, and the limit of the range comes nearer as the resolution decreases.

Therefore, for each hierarchy, a limit within which data can be treated as valid is set as a depth limit in the depthwise direction, and the depth limit is compared with the position in the depthwise direction specified by the position specification section 54 to specify invalid data. By such specification, occurrence of such a failure that, when the image pickup apparatus 12 itself sways or a great movement of something other than the target whose movement is to be followed originally appears behind, such swaying movement or great movement is used as data in a process at a succeeding stage is prevented.

The data production section 58 produces a depth image based on the position information which remains as a result of exclusion of the invalid data specified by the invalid data detection section 56. Such depth images have a hierarchical structure having resolutions corresponding to a plurality of resolutions produced by the image pickup apparatus 12. As the hierarchical data of the depth image, an initial value such as 0 is provided to all pixel values and stored in a depth image data storage section 60 in advance.

Then, every time the position specification section 54 specifies the position of the target, a pixel at a corresponding position in a hierarchy corresponding to the hierarchy of the picked up image used in stereo matching is used as a coordinate value in the depthwise direction to update the depth image. As a result, the depth image data are updated at a rate equal to the processing rate of stereo matching. The output information production section 32 of the information processing apparatus 14 selects a hierarchy and reads out position information from within the depth image data in response to a spatial resolution necessary for a process to be carried out by the output information production section 32 itself, and utilizes the position information suitably for processing.

Figure 6:
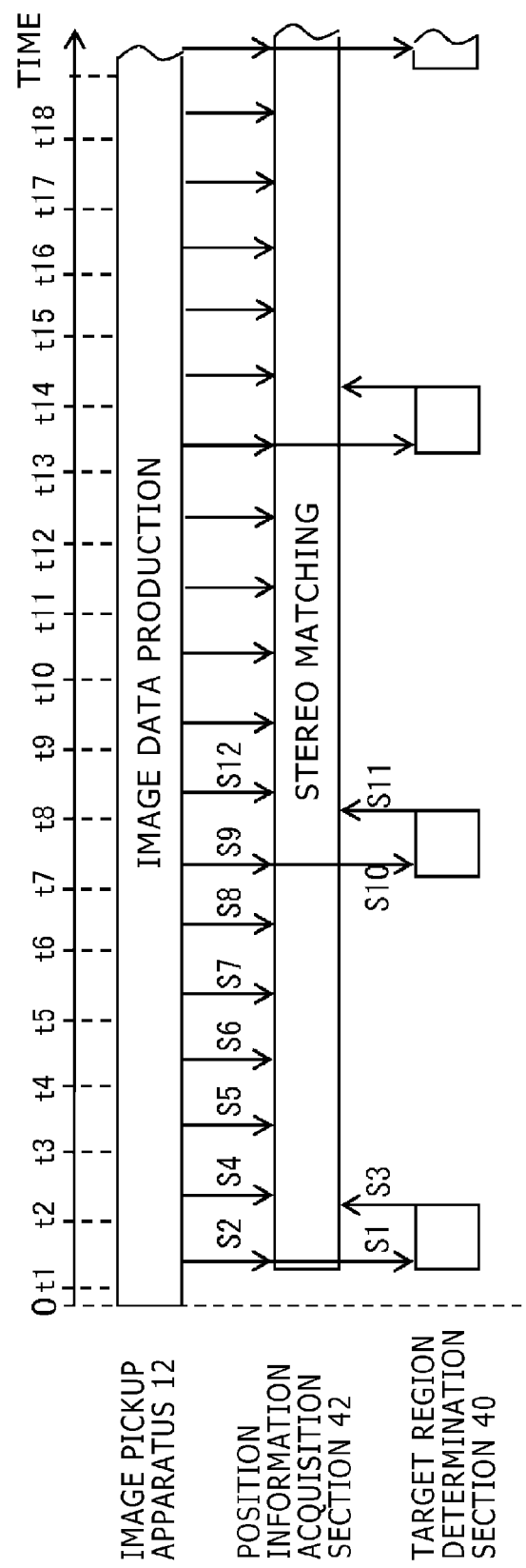
FIG. 6 is a view schematically illustrating a time relationship of processes carried out by the image pickup apparatus, a position information acquisition section and a target region determination section in the present embodiment.

FIG. 6 schematically illustrates a time relationship of processes executed by the image pickup apparatus 12, position information acquisition section 42 and target region determination section 40, and the horizontal direction of FIG. 6 indicates the time axis. If all processes are started at time point 0, then the image pickup apparatus 12 picks up images of the target at a predetermined frame rate at time points t1, t2, t3, . . . , t18, . . . , generates image data of a plurality of resolutions and signals necessary data to the information processing apparatus 14. In FIG. 6, the image data production process carried out by the image pickup apparatus 12 is indicated by a continuous rectangle over an overall period. However, actually after data production and data signaling of an image picked up at each image pickup time point, the image pickup apparatus 12 may wait till a next image pickup time point. This applies also to processing carried out by the position information acquisition section 42.

An entire image of the low resolution from among the picked up images at time point t1 in the first time image pickup is supplied to the target region determination section 40 of the information processing apparatus 14 (S1). At this time, the entire image of a predetermined hierarchy is supplied also to the position information acquisition section 42 (S2). The hierarchy at this time is set in advance to a hierarchy which is low in resolution within a range within which accuracy in stereo matching is obtained sufficiently assuming that the target is positioned at a standard position. Since the size decreases as the image resolution decreases, a search for a corresponding point can be carried out efficiently.

The position information acquisition section 42 successively carries out processes for stereo matching, exclusion of invalid data and depth image updating using the stereo images supplied at S2. Consequently, position information of the target corresponding to time point t1 is outputted in the form of a depth image having a hierarchical structure. On the other hand, the target region determination section 40 successively carries out processes for movement region detection, region prediction, region integration and hierarchy determination using the stereo images supplied at S1. Then, information of the determined target region and hierarchy is conveyed to the position information acquisition section 42 (S3).

The information of the target region and the hierarchy determined at this time is for images picked up at time points t2, t3, t4, t5, t6 and t7. The region prediction section 48 of the target region determination section 40 takes time periods till the time points into consideration to estimate a movable range of the target from the movement region at present and predict the target region for each time point so as to include the range. The position information acquisition section 42 acquires, every time data of picked up images produced at time point t2, t3, t4, t5, t6 or t7 is produced, stereo image data of the target region and the hierarchy determined corresponding to each time point based on the information conveyed thereto at S3 (S4, S5, S6, S7, S8, S9).

At the same timing as S9, the entire image of the lowest resolution from among the picked up images at time point t7 is supplied to the target region determination section 40 (S10). The target region determination section 40 successively carries out processes for movement region detection, region prediction, region integration and hierarchy determination again and notifies the position information acquisition section 42 of information of a target region and a hierarchy determined by the processes (S11). The information of the target region and the hierarchy determined at this time is for images picked up at time points t8, t9, t10, t11, t12 and t13.

Thereafter, as similar processes are repeated, position information of the target in the images picked up at the individual time points is outputted as a depth image. It is to be noted that, although, in the figure, position information is acquired with regard to all frames picked up by the image pickup apparatus 12, the time interval between processes may be expanded in response to a time resolution required for position information in a process at a succeeding stage carried out by the output information production section 32 or to a processing capacity of the information processing system 10 as described hereinabove. For example, the processes may be carried out at a rate equal to that of the processes carried out by the target region determination section 40.

Figure 7:
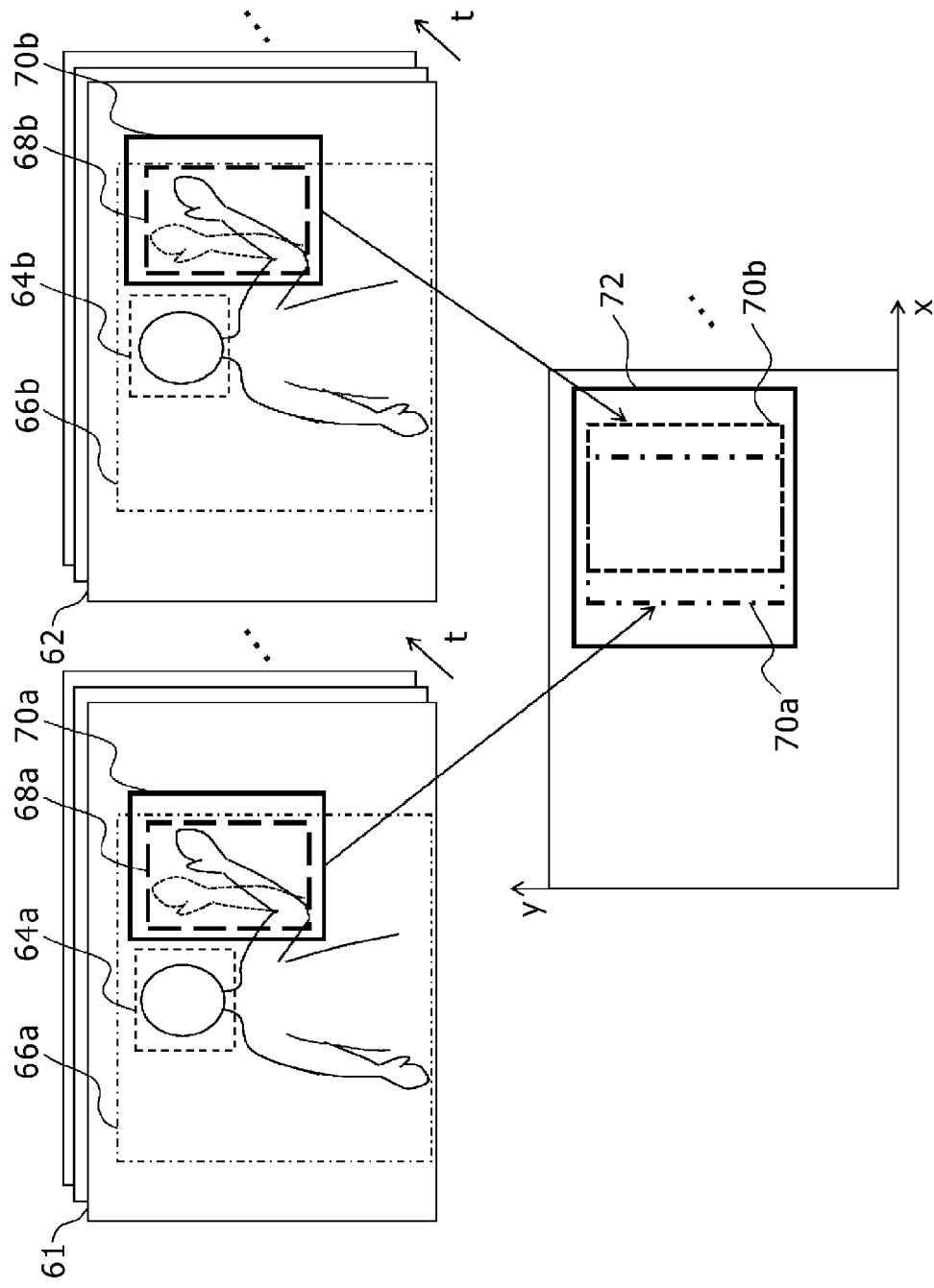
FIG. 7 is a view schematically illustrating a manner of processes carried out by a movement region detection section, a region prediction section and a region integration section of the information processing apparatus in the present embodiment.

FIG. 7 schematically illustrates a manner of the processes carried out by the movement region detection section 46, region prediction section 48 and region integration section of the information processing apparatus 14. Images 61 are images picked up by the first camera 22, and images 62 are images picked up by the second camera 24. Since the cameras carry out image pickup at a predetermined rate at time points t, an image sequence is produced for time points t as illustrated in FIG. 7. In this example, in an image 61 and an image 62 at a certain point of time, a person is reflected as indicated by solid lines in the figure.

Since the first camera 22 and the second camera 24 carry out image pickup of the person from points of view juxtaposed leftwardly and rightwardly, images of the person in the image 61 and the image 62 exhibit a parallax between left and right. The target region determination section 40 determines a target region making use of the stereo images picked up from the left and right points of view in this manner. First, the movement region detection section 46 carries out determination of a movement region within the image 61 and the image 62 independently from each other.

In particular, if the target is a person, a face detection process is first carried out to detect a face region 64*a* in the image 61 and a face region 64*b* in the image 62. To the face detection process, any of various general techniques such as pattern matching may be applied. Even if the target is not a person, if the shape of the target is known and a template image can be prepared, then a similar process can be carried out. For example, even if the target is a hand, a marker gripped by the user who is an image pickup target or the like, if a template image representative of the shape of the target is prepared in advance in a memory or the like, then a similar process can be carried out.

Then, a region of the images 61 and 62 which is a movement region with a high degree of possibility is determined as movement detection target regions 66*a* and 66*b*, respectively, based on the size and the position of the face regions 64*a* and 64*b*. The region which is a movement region with a high degree of possibility is a range over which the body of the person extends and can be predicted readily if the position of the face is known. For example, a reference image on which a reference face line and a range of a movement detection target region to be set with respect to the face are indicated by a rectangle is prepared in advance. The reference image is expanded or reduced such that the reference face line almost overlaps with the contour of the face in the face regions 64*a* and 64*b* obtained by the face detection process. The rectangles of the reference image at this time are the movement detection target regions 66*a* and 66*b*.

Then, difference images between the movement detection target regions 66*a* and 66*b* and corresponding regions in entire images acquired in the target region determination process in the preceding operation cycle are respectively acquired by comparing the left images and by comparing the right images. A portion in which the difference is greater than a predetermined threshold value is then extracted. In FIG. 7, the left hands reflected in the entire images acquired in the preceding operation cycle are indicated by broken lines on the images 61 and 62. If it is assumed that no change has occurred with any other portion, then a great difference appears only in the left hand portions. In this manner, portions in which the difference is equal to or greater than the threshold value are extracted, and rectangles which circumscribe the portions are determined as movement regions 68*a* and 68*b*.

Then, the region prediction section 48 carries out, based on the movement regions 68*a* and 68*b* determined in the image 61 and the image 62, respectively, region prediction supposing an image pickup time point of images which become a target of stereo matching. This process may be carried out by expanding the movement regions 68*a* and 68*b* at an equal ratio in the vertical direction and the horizontal direction with an amount merely increasing in proportion to the lapse of time, or by predicting the direction of movement of the target based on an autoregressive model or the like from a plurality of images acquired in target region determination processes in and before the preceding operation cycle and then expanding the movement regions 68a and 68b only in the predicted direction. Or else, they may be combined.

Prediction regions 70a and 70b are determined for the image 61 and the image 62 in this manner, respectively. It is to be noted that, although only one prediction region is shown for each image in FIG. 7, a prediction region is determined for each point of time at which a target image for stereo matching is picked up as described hereinabove. Then, the region integration section 50 superposes the prediction regions 70a and 70b determined respectively for the left and right images with each other on a normalized coordinate system which configures an image plane to determine a region of the sum of them (region included in at least one of the regions), thereby integrating the prediction regions 70a and 70b.

Since images picked up from different left and right points of view exhibit a parallax therebetween in the horizontal direction, the prediction regions 70a and 70b are displaced from each other in the x direction (horizontal direction) on the coordinate system which configures the image plane as shown in FIG. 7. A target region is determined from two images in this manner for the following reason. In particular, since the size of an image of a target apparently increases as the target is positioned nearer, a range over which a movement reaches becomes wider and there is an increasing possibility that the range exceeds the prediction region determined in such a manner as described above.

Therefore, the parallax is utilized in order to adjust the extent of the target region in response to the variation of an apparent size of a movement which relies upon the position of the target in the depthwise direction. Since the displacement between the prediction regions 70a and 70b increases as the parallax increases, the region of the sum of them increases. However, if the parallax is small, then the displacement is small and the region of the sum does not become very great. By adjusting the extent of the region taking the position of the target in the depthwise direction into consideration in this manner, a surplus region is prevented from being included while the target is prevented from going out from the target region.

It is to be noted that the region integration section 50 further determines the region obtained by expanding the sum region in both of the vertical and horizontal directions by a predetermined expansion rate as a final target region 72. By such determination, the possibility that the target may go out from the target region can be reduced further.

Figure 8:
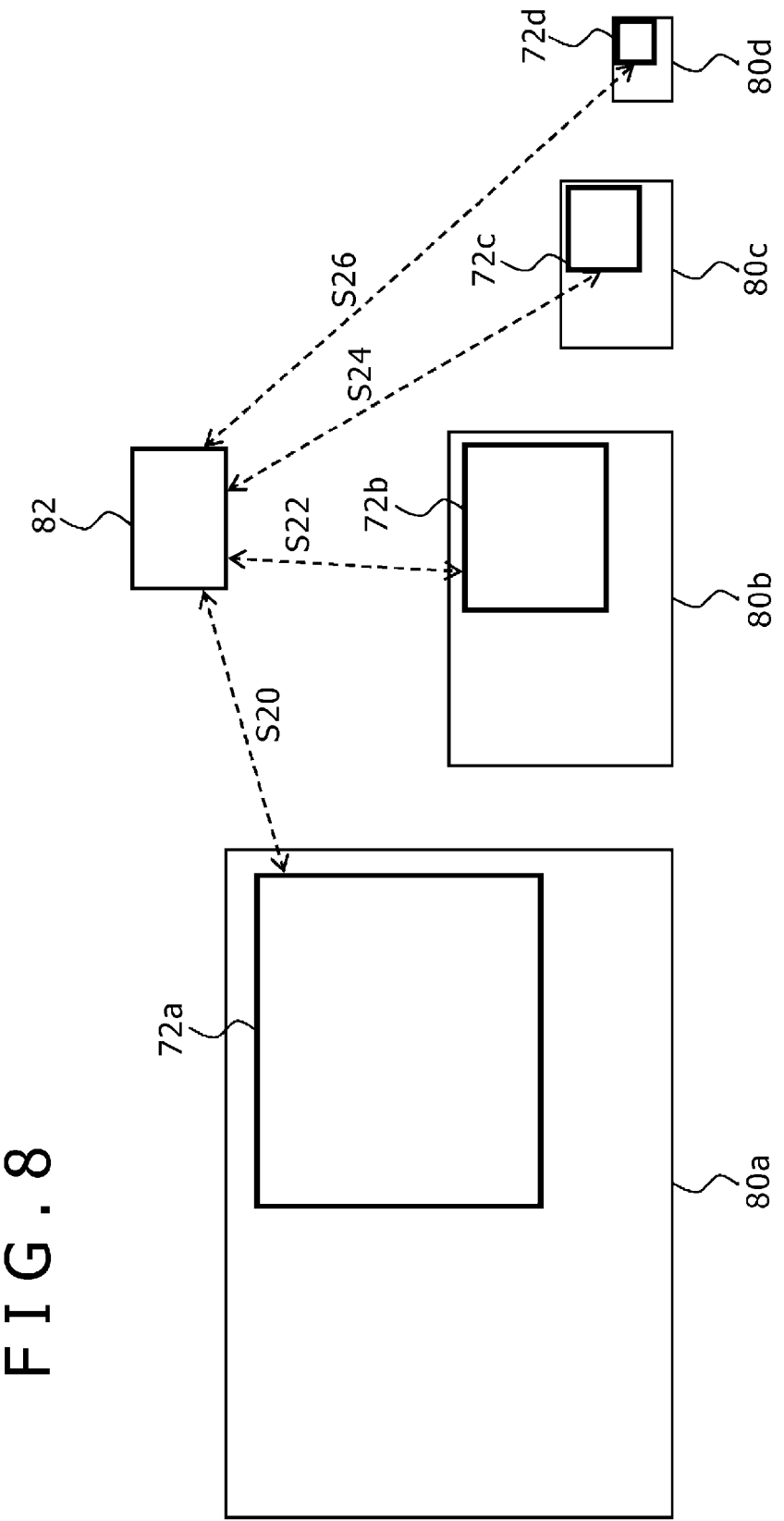
FIG. 8 is a view schematically illustrating a manner in which a hierarchy determination section in the present embodiment selects a hierarchy to be used for stereo matching based on the size of a target region.

FIG. 8 schematically illustrates a manner in which the hierarchy determination section 52 selects a hierarchy to be used for stereo matching based on the size of the target region. Referring to FIG. 8, rectangles 80a, 80b, 80c and 80d represent image sizes of the third hierarchy, second hierarchy, first hierarchy and 0th hierarchy from among hierarchies of picked up images. The target region 72 determined on the normalized coordinate system for an image in FIG. 7 exhibits such sizes of rectangles 72a, 72b, 72c and 72d with respect to the individual image sizes.

The rectangles 72a, 72b, 72c and 72d obtained by making the target region 72 correspond to the image sizes of the individual hierarchies are compared with a reference size rectangle 82 to select a hierarchy with which the size of the target region becomes proximate to the size of the reference size rectangle 82. The reference size rectangle 82 has an apparent size of the target defined so as to be necessary to obtain a suitable degree of accuracy upon stereo matching and is set in advance through an experiment or the like.

The size may be determined bigger or smaller in the following manner. One of two rectangles which is included in the other when the two rectangles have an inclusion relationship therebetween may be regarded as a "smaller" rectangle, or two rectangles may be compared with each other in area. Or, two rectangles may be compared with each other only in length of one of a vertical side and a horizontal side. Further, upon selection of a hierarchy, either one of two rectangles which precede to and succeeds the reference size rectangle 82 in the permutation in size from among the rectangles 72a, 72b, 72c and 72d corresponding to the individual hierarchies may be selected, and the selected rectangle may not necessarily be a rectangle having a size nearest to that of the reference size rectangle 82.

For example, in the case of FIG. 8, since the reference size rectangle 82 has a size between those of the rectangle 72b and the rectangle 72c from among the rectangles 72a, 72b, 72c and 72d, the second hierarchy corresponding to the rectangle 72b or the first hierarchy corresponding to the rectangle 72c is selected. For example, the rectangles 72a, 72b, 72c and 72d are successively compared in the descending order in size beginning with the rectangle 72a of the third hierarchy having the greatest size (in the order of S20, S22, S24 and S26), and a hierarchy corresponding to a rectangle included in the reference size rectangle 82 first may be selected. In the example illustrated in FIG. 8, the first hierarchy corresponding to the rectangle 72c is selected.

Where such a procedure as just described is adopted, a hierarchy of a lower resolution from between hierarchies in which a rectangle proximate to a reference size rectangle is obtained can be selected, and the calculation amount can be suppressed further. Anyway, by selecting a hierarchy in which a target region of a size proximate to that of the reference size rectangle 82 is obtained in this manner, the resolution of an image to be used for stereo matching can be adjusted in accordance with an apparent size of the target as described above. As a result, while occurrence of wasteful searching for detailed image data more than necessary is suppressed, the accuracy can be maintained.

Figure 9:
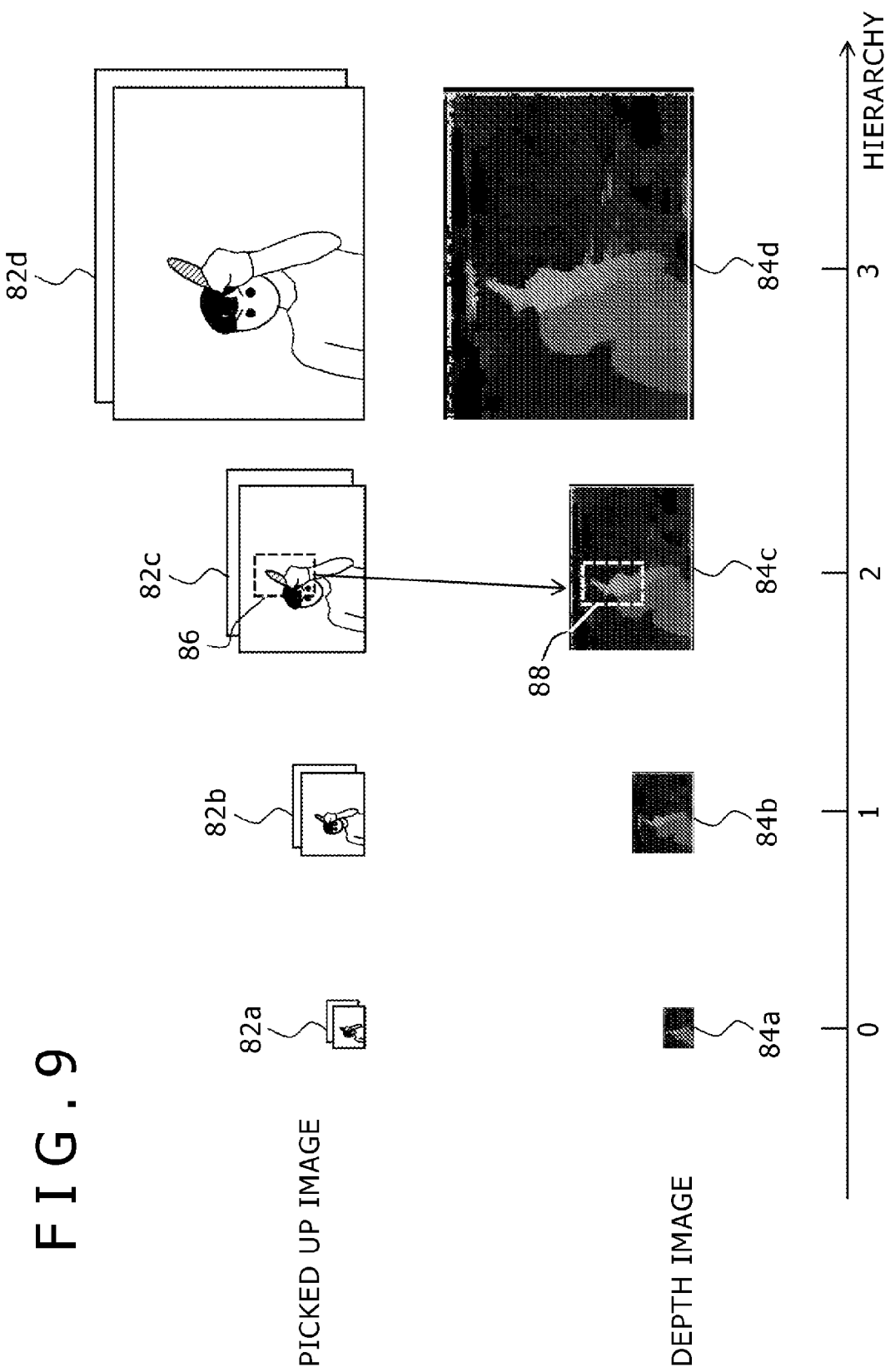
FIG. 9 is a view illustrating a correspondence relationship between hierarchies of picked up images produced by the image pickup apparatus in the present embodiment and hierarchies of depth images produced by a data production section of the position information acquisition section.

FIG. 9 illustrates a corresponding relationship between hierarchies of picked up images produced by the image pickup apparatus 12 and hierarchies of depth images produced by the data production section 58 of the position information acquisition section 42. Referring to FIG. 9, four sets of images 82a, 82b, 82c and 82d on the upper side are stereo images picked up at a certain point of time, and four images 84a, 84b, 84c and 84d on the lower side are depth images produced with respect to the stereo images. The images on the upper and lower sides are images of the 0th hierarchy, first hierarchy, second hierarchy and third hierarchy in order from the left.

For example, if an image of a person who is swinging a bar-like article in front of the face is picked up, then at a certain point of time, such picked up images as the images 82a, 82b, 82c and 82d are produced one by one with respect to the two points of view. If the hierarchy determined as to such picked up images by the target region determination section 40 is the second hierarchy and the target region is a region 86, then the position information acquisition section 42 acquires the left and right image data of the hierarchy and the region to carry out stereo matching.

Then, if position information of the target in the region is obtained, then pixel values of the hierarchy data of the depth image in the corresponding region in the corresponding hierarchy, namely, in a region 88 are updated. At this time, if the lowest value (nearest position) from within position coordinates in the depthwise direction obtained with respect to the region 86 indicates a position deeper than the depth limit set to the second hierarchy, then the updating process is not carried out. This is because it is intended to exclude, as an error, a case in which a great movement at a depthwise position which should not originally be obtained accurately as a position of the target in the resolution occurs by some factor as described hereinabove. The hierarchies and the depth limits are stored in a coordinated relationship as a table in a memory or the like in advance.

In this manner, the depth images have a hierarchical structure, and data of a hierarchy corresponding to a hierarchy of a picked up image used for stereo matching are updated at each point of time. The resolution of an image corresponds to a range of a position of the target in the depthwise direction obtained with a high degree of accuracy from the image. Therefore, by hierarchically layering a depth image for each resolution of an image used for stereo matching and reflecting the obtained position information only on the corresponding hierarchy, the position of the target is delineated by a range of the position in the depthwise direction.

This output information production section 32 which carries out processing using a depth image suitably selects and refers to the hierarchy of the depth image in response to contents of processing to be carried out or to required accuracy. This ensures that, while necessary information is acquired with certainty, such a situation that surplus data is included into the processing and consequently the processing accuracy is deteriorated or the processing speed drops can be prevented.

For example, when it is desired to ignore a movement of a target far from the cameras, only an image of a low resolution of the 0th hierarchy or the first hierarchy is referred to. When attention is paid only to a movement of a deep target conversely, only an image of a high resolution of the second hierarchy or the third hierarchy is referred to. When it is desired to acquire all of movements over a wide range from the front to the back, the 0th hierarchy to the third hierarchy may be referred to successively. The hierarchy of a depth image to be referred to may be set in advance for the processing contents, the position or the size of an expected target or the like by actually carrying out the process for verification.

According to the present embodiment described above, two cameras are provided on an image pickup apparatus and the cameras simultaneously pick up moving pictures of a target from different points of view. The picked up images are converted into a plurality of hierarchical images of different resolutions by a pyramid filter. Then, an entire image of a low resolution is used to detect a movement region and a hierarchy conforming to the size of the movement region is selected, and then only a target region in which it is predicted to include a movement of the target is acquired to carry out stereo matching.

Consequently, at whichever position the target exists in the depthwise direction, useless data processing can be omitted within a range within which the accuracy in stereo matching can be maintained, and both of the accuracy and the processing efficiency can be anticipated. Further, even if the position of the target changes, since the image size of the target region does not change by a great amount, the calculation amount does not rely upon the position of the target and stabilized position information outputting can be anticipated.

Further, by predicting a future target region based on the movement of the target and so forth, a process of determining a target region and stereo matching are carried out at timings independent of each other. Consequently, in what frequency the two processes are to be carried out can be determined freely taking process resources, a processing capacity, a required response, required accuracy and so forth into consideration.

Further, for the determination of a target region, both of two stereo images picked up by two cameras are used and a target region is determined based on a sum region of movement regions obtained on both of the stereo images. Consequently, for a target on the near side with regard to which the movement range is great, the target region can be expanded, and the possibility that the target may protrude from the target region decreases. On the other hand, for a target on the remote side with regard to which the possibility of such protrusion is originally low, the extent of the target region is suppressed and inclusion of a useless region in the target region decreases.

Further, the obtained position information has a hierarchical structure wherein a depth image whose position in the depthwise direction is represented by a pixel value is represented by a plurality of resolutions. Further, pixel values in the region of the hierarchy corresponding to an image used in stereo matching are updated at each point of time. Consequently, the hierarchy to be referred to can be changed over in response to a degree of accuracy, a resolution, an expected range of the position of a target in the depthwise direction and so forth required in a process at a later stage which is carried out using position information. Consequently, a reference process and various processes in which information referred to is used can be made more efficient.

The present invention has been described based on the embodiment. The embodiment described above is illustrative, and it is recognized by those skilled in the art that various modifications are possible in regard to the combinations of the components and processing procedures of the embodiment and that also such modifications fall within the scope of the present invention.

For example, while, in the present embodiment, stereo matching is carried out for a target region determined by the target region determination section 40 to acquire three-dimensional position information of a target, the technology of determining a target region can be applied also to processes other than stereo matching. For example, the technology may be applied to a process which does not require detailed position information in the depthwise direction such as a facial expression recognition process. Also in this instance, it is possible to use stereo images to adjust the extent of a target region depending upon the position of the face in the depthwise direction and select an image of an optimum resolution. Therefore, both of the accuracy and the efficiency of later processing can be anticipated.

Figure 10:
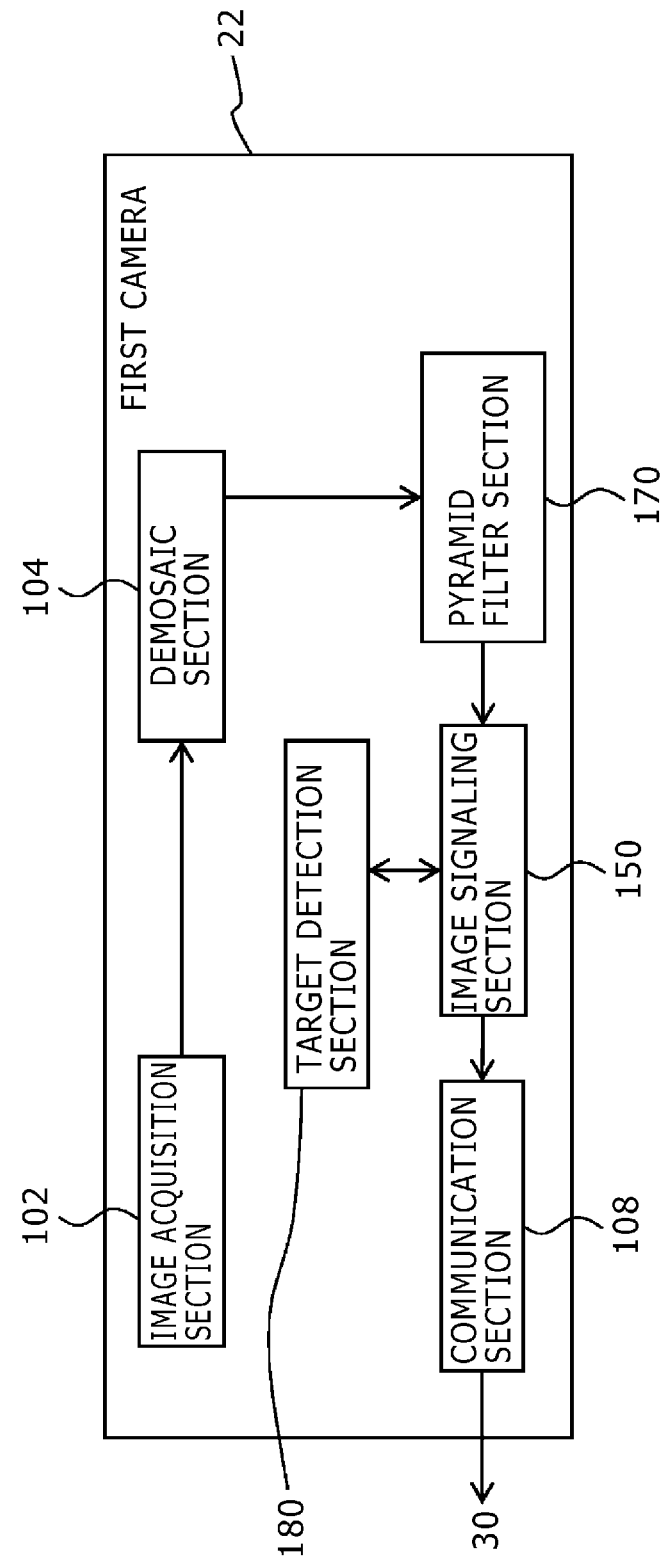
FIG. 10 is a view particularly showing a configuration of the first camera in a modification to the present embodiment.

Further, in the present embodiment, as initial processing for specifying a region which involves a movement, namely, a target region, a face detection process is carried out by the movement region detection section 46 of the information processing apparatus 14. On the other hand, the function of this face detection process may be provided in each camera of the image pickup apparatus 12. FIG. 10 shows a configuration of the first camera 22 in such a case as just described. Here, an image acquisition section 102, a demosaic section 104, an image signaling section 150, a pyramid filter section 170 and a communication section 108 provided in the first camera 22 are same as the functional blocks in FIG. 3. In the present modification, the first camera 22 further includes a target detection section 180. Also the second camera 24 has the same configuration.

The target detection section 180 acquires an image which is to be made a processing target by the target region determination section 40 in the information processing apparatus 14, for example, an image of the entire region of the 0th hierarchy whose resolution is lowest, from the block reading out section 156 of the image signaling section 150. Then, the target detection section 180 carries out a face detection process for the acquired image to specify a face region. Then, information regarding the position and the size of the region is conveyed to the packetization section 160 of the image signaling section 150, and the conveyed information is packetized together with the image data entity of a detection target and transmitted to the information processing apparatus 14. Or, the information is transmitted in an associated relationship with identification information of the image of the detection target or the like from the communication section 108 to the information processing apparatus 14.

In this instance, by acquiring information of the face region in an image at each point of time from the image pickup apparatus 12 together with the image data, the movement region detection section 46 of the information processing apparatus 14 need not carry out a process for detecting the face regions 64a and 64b shown in FIG. 7. At this time, the movement region detection section 46 carries out processing beginning with a process for determining the movement detection target regions 66a and 66b. By changing the allocation of processes depending upon the processing capacity of the image pickup apparatus 12 in this manner, efficient target region specification can be achieved, and consequently, position information production high in response and accuracy can be anticipated.

The target of the detection process carried out by the target detection section 180 here is not limited to the face of a person but may be any of a hand, a marker, a predetermined article and so forth by introducing an existing template matching technology as described hereinabove and preparing a suitable template image. For example, in the information processing apparatus 14, the input information acquisition section 26 specifies, in response to the name of a game or a type of an information process whose starting is designated by a user, a corresponding target and notifies the image pickup apparatus 12 of identification information.

The cameras of the image pickup apparatus 12 read out template images corresponding to the notified target from among a plurality of template images prepared in a memory not shown and carry out template matching to detect the target. Or, the information processing apparatus 14 may transmit data itself of a template image to the image pickup apparatus 12. This ensures that the target can be changed in various manners in response to an instruction input of the user or the like.

REFERENCE SIGNS LIST

10 Information processing system, 12 Image pickup apparatus, 14 Information processing apparatus, Display apparatus, 22 First camera, 24 Second camera, 26 Input information acquisition section, 28 Position information production section, 30 Communication section, 32 Output information production section, 40 Target region determination section, 42 Position information acquisition section, 44 Entire image acquisition section, 46 Movement region detection section, 48 Region prediction section, 50 Region integration section, 52 Hierarchy determination section, 53 Target region image acquisition section, 54 Position specification section, 56 Invalid data detection section, 58 Data production section, 60 Depth image data storage section, 102 Image acquisition section, 104 Demosaic section, 108 Communication section, 150 Image signaling section, 151 Block selection section, 164 Control section, 170 Pyramid filter section, 180 Target detection section.

INDUSTRIAL APPLICABILITY

As described above, the present invention can be applied to information processing apparatus such as a computer, a camera, a game apparatus and an image display apparatus.

The invention claimed is:

1. An information processing apparatus, comprising:
a communications unit adapted to receive image data from a stereo movie, the stereo movie including a sequence of stereo image frames, each stereo image frame including first image data and second image data taken at a respective time in the sequence, the first image data including a first image frame captured along a first line of sight of a scene containing a subject, and saved at a plurality of hierarchical image resolutions, the second image data including a second image frame captured along a second line of sight of the scene, and saved at a plurality of hierarchical image resolutions;
a position information acquisition section adapted to compute three-dimensional position information of the subject within a scene by performing stereo matching between respective areas, each defined by a final target area, of the first image frame and the second image frame at a selected one of the plurality of hierarchical image resolutions and at time t(i), wherein the final target area and the selected one of the plurality of hierarchical image resolutions are produced in accordance with a process comprising:
acquiring the first image frame and the second image frame at a predetermined one of the plurality of hierarchical image resolutions and at each of time t(i) and time t(i+1), and identifying: (a) a first motion area by computing a difference between the first image frame at time t(i) and the first image frame at time t(i+1), and (b) a second motion area by computing a difference between the second image frame at time t(i) and the second image frame at time t(i+1);
determining a first target area by expanding a boundary of the first motion area, a second target area by expanding a boundary of the second motion area, and the final target area by aggregating the first and second target areas using superposition, such that the final target area is larger than either of the first and second target areas alone; and
converting a size of the final target area at the predetermined one of the plurality of hierarchical image resolutions into a respective size of the final target area at each of the plurality of hierarchical image resolutions, and selecting the one of the plurality of hierarchical image resolutions at which the size of the final target area at such resolution meets a criteria of comparison with a size of a predetermined reference area; and
a depth image data production section adapted to update a depth image at time t(i) containing pixel values based on portions of the first and second image frames defined by the final target area region at the selected one of the plurality of hierarchical image resolutions.

2. The information processing apparatus according to claim 1, wherein the depth image data production section does not update the depth image at time t(i) when the position information acquired by the position information acquisition section is outside a range in a depthwise direction.

3. The information processing apparatus according to claim 1, wherein the position information acquisition section employs the final target area and the selected one of the plurality of hierarchical image resolutions to compute a sequence of three-dimensional position information of the subject within subsequent first and second image frames at subsequent times t(i), i=1, 2, . . . j.

4. The information processing apparatus according to claim 3, wherein
  at time t(j), the position information acquisition section updates the first motion area, the second motion area, the first target area, the second target area, the final target area, and the selected one of the plurality of hierarchical image resolutions;
  the position information acquisition section employs the updated final target area and the updated selected one of the plurality of hierarchical image resolutions to compute respective three-dimensional position information of the subject within subsequent first and second image frames at times t(j+i), i=1, 2, . . . j; and
  at subsequent times, the position information acquisition section updates the first motion area, the second motion area, the first target area, the second target area, the final target area, and the selected one of the plurality of hierarchical image resolutions.

5. The information processing apparatus according to claim 1, wherein the criteria of comparison is such that the selected one of the plurality of hierarchical image resolutions is one at which the size of the final target area at such resolution is less than or equal to the size of a predetermined reference area.

6. The information processing apparatus according to claim 1, wherein:
  the first motion area is determined by the position information acquisition section by computing a difference between a first motion detection target area within the first image frame at time t(i), and a first motion detection target area within the first image frame at time t(i+1);
  the second motion area is determined by the position information acquisition section by computing a difference between a second motion detection target area within the second image frame at time t(i), and a second motion detection target area within the second image frame at time t(i+1); and
  sizes of the first motion detection target area and the second motion detection target area are based on detection of one or more features within the scene.

7. An information processing method of carrying out stereo matching at a predetermined rate, comprising:
  receiving image data from a stereo movie, the stereo movie including a sequence of stereo image frames, each stereo image frame including first image data and second image data taken at a respective time in the sequence, the first image data including a first image frame captured along a first line of sight of a scene containing a subject, and saved at a plurality of hierarchical image resolutions, the second image data including a second image frame captured along a second line of sight of the scene, and saved at a plurality of hierarchical image resolutions;
  computing three-dimensional position information of the subject within a scene by performing stereo matching between respective areas, each defined by a final target area, of the first image frame and the second image frame at a selected one of the plurality of hierarchical image resolutions and at time t(i),wherein the final target area and the selected one of the plurality of hierarchical image resolutions are produced in accordance with a process comprising:
    acquiring the first image frame and the second image frame at a predetermined one of the plurality of hierarchical image resolutions and at each of time t(i) and time t(+1), and identifying: (a) a first motion area by computing a difference between the first image frame at time t(i) and the first image frame at time t(i+1), and (b) a second motion area by computing a difference between the second image frame at time t(i) and the second image frame at time t(i+1);
    determining a first target area by expanding a boundary of the first motion area, a second target area by expanding a boundary of the second motion area, and the final target area by aggregating the first and second target areas using superposition, such that the final target area is larger than either of the first and second target areas alone; and
    converting a size of the final target area at the predetermined one of the plurality of hierarchical image resolutions into a respective size of the final target area at each of the plurality of hierarchical image resolutions, and selecting the one of the plurality of hierarchical image resolutions at which the size of the final target area at such resolution meets a criteria of comparison with a size of a predetermined reference area; and
  updating a depth image at time t(i) containing pixel values based on portions of the first and second image frames defined by the final target area region at the selected one of the plurality of hierarchical image resolutions.

8. A processing system executing a computer program for causing a computer to implement a function for carrying out stereo matching at a predetermined rate, the computer program causing the computer to carry out actions, comprising:
  receiving image data from a stereo movie, the stereo movie including a sequence of stereo image frames, each stereo image frame including first image data and second image data taken at a respective time in the sequence, the first image data including a first image frame captured along a first line of sight of a scene containing a subject, and saved at a plurality of hierarchical image resolutions, the second image data including a second image frame captured along a second line of sight of the scene, and saved at a plurality of hierarchical image resolutions;
  computing three-dimensional position information of the subject within a scene by performing stereo matching between respective areas, each defined by a final target area, of the first image frame and the second image frame at a selected one of the plurality of hierarchical image resolutions and at time t(i),wherein the final target area and the selected one of the plurality of hierarchical image resolutions are produced in accordance with a process comprising:
    acquiring the first image frame and the second image frame at a predetermined one of the plurality of hierarchical image resolutions and at each of time t(i)

and time t(i+1), and identifying: (a) a first motion area by computing a difference between the first image frame at time t(i) and the first image frame at time t(i+1), and (b) a second motion area by computing a difference between the second image frame at time t(i) and the second image frame at time t(i+1);

determining a first target area by expanding a boundary of the first motion area, a second target area by expanding a boundary of the second motion area, and the final target area by aggregating the first and second target areas using superposition, such that the final target area is larger than either of the first and second target areas alone; and converting a size of the final target area at the predetermined one of the plurality of hierarchical image resolutions into a respective size of the final target area at each of the plurality of hierarchical image resolutions, and selecting the one of the plurality of hierarchical image resolutions at which the size of the final target area at such resolution meets a criteria of comparison with a size of a predetermined reference area; and updating a depth image at time t(i) containing pixel values based on portions of the first and second image frames defined by the final target area region at the selected one of the plurality of hierarchical image resolutions.

9. A non-transitory, computer readable recording medium in which a computer program is stored for causing a computer to implement a function for carrying out stereo matching a predetermined rate is recorded, the computer program causing the computer to carry out actions, comprising:

receiving image data from a stereo movie, the stereo movie including a sequence of stereo image frames, each stereo image frame including first image data and second image data taken at a respective time in the sequence, the first image data including a first image frame captured along a first line of sight of a scene containing a subject, and saved at a plurality of hierarchical image resolutions, the second image data including a second image frame captured along a second line of sight of the scene, and saved at a plurality of hierarchical image resolutions;

computing three-dimensional position information of the subject within a scene by performing stereo matching between respective areas, each defined by a final target area, of the first image frame and the second image frame at a selected one of the plurality of hierarchical image resolutions and at time t(i), wherein the final target area and the selected one of the plurality of hierarchical image resolutions are produced in accordance with a process comprising:

acquiring the first image frame and the second image frame at a predetermined one of the plurality of hierarchical image resolutions and at each of time t(i) and time t(i+1), and identifying: (a) a first motion area by computing a difference between the first image frame at time t(i) and the first image frame at time t(i+1), and (b) a second motion area by computing a difference between the second image frame at time t(i) and the second image frame at time t(i+1);

determining a first target area by expanding a boundary of the first motion area, a second target area by expanding a boundary of the second motion area, and the final target area by aggregating the first and second target areas using superposition, such that the final target area is larger than either of the first and second target areas alone; and converting a size of the final target area at the predetermined one of the plurality of hierarchical image resolutions into a respective size of the final target area at each of the plurality of hierarchical image resolutions, and selecting the one of the plurality of hierarchical image resolutions at which the size of the final target area at such resolution meets a criteria of comparison with a size of a predetermined reference area; and updating a depth image at time t(i) containing pixel values based on portions of the first and second image frames defined by the final target area region at the selected one of the plurality of hierarchical image resolutions.

10. The An information processing apparatus of claim 1, wherein:

the first target area is expanded beyond the boundary of the first motion area to include at least some area containing no motion; and the second target area is expanded beyond the boundary of the second motion area to include at least some area without motion.

* * * * *